United States Patent [19]

Pfordresher

[11] Patent Number: 5,696,358

[45] Date of Patent: Dec. 9, 1997

[54] APPLIANCE MUFFLER

[76] Inventor: Michael Pfordresher, 11000 S. Ocean Dr., Apartment 5-D, Jensen Beach, Fla. 34957

[21] Appl. No.: 499,433

[22] Filed: Jul. 7, 1995

Related U.S. Application Data

[63] Continuation-in-part of Ser. No. 83,653, Jun. 25, 1993, Pat. No. 5,432,306.

[51] Int. Cl.⁶ ............................................... A47B 81/06
[52] U.S. Cl. ....................................... 181/198; 181/202
[58] Field of Search ............................ 181/198, 200, 181/202, 203, 204, 205, 208, 211, 230

[56] References Cited

U.S. PATENT DOCUMENTS

4,892,413  1/1990  Vats ............................... 181/200 X

*Primary Examiner*—Khanh Dang
*Attorney, Agent, or Firm*—Malin, Haley, DiMaggio & Crosby, PA

[57] ABSTRACT

An appliance muffling device for reducing noise and vibrations produced by conventional appliances, such as blenders, comprising a uniform cover connectable to a uniform base enclosure both preferably having side walls where a connection is made through snapping engagement so as to form an interior volume for enclosing an appliance, wherein the switch or switches of the appliance are engageable by a slidable switch engaging member assembled on opposite sides of the base side walls through an aperture defined by the base side walls. The appliance muffling device further comprises a ventilating system including an air intake chamber, for receiving ambient air from a plurality of air intake channels defined by the base in communication therewith, and an exhaust channel separate and independent from the air intake chamber for exhausting heat produced and emitted by the enclosed appliance.

25 Claims, 11 Drawing Sheets

APPLIANCE MUFFLER

This application is a continuation-in-part of U.S. application Ser. No. 08/083,653, filed Jun. 25, 1993, which issues as U.S. Pat. No. 5,432,306, Jul. 11, 1995.

BACKGROUND OF THE INVENTION

1. Field of the Invention

This invention relates generally to an appliance muffler, and in particular, to a sound-absorbing and impact-protecting device for enclosing appliances, such as blenders, to muffle noise emissions and to absorb impact.

2. Description of the Prior Art

Small, motor-operated appliances, such as blenders, produce vibrations and emit noises during operation that are at best annoying. Most of these appliances are powered by high-RPM motors that emit acoustic waves at frequencies which are sensitive to the human eardrum. Repeated exposure to such sound waves has been known to cause damage to the eardrum. In any event, in restaurants or taverns, these sounds make it difficult for employees and patrons to communicate. While at home, a loud kitchen appliance can be bothersome to guests and intolerable to the host. An additional problem exists for appliances found in congested areas wherein they are susceptible to damage from impact caused by falling and banging. Therefore, a device capable of reducing appliance operating noise and vibrations having the added benefit of providing protection from impact would be well received.

Several structures known in the background art are adapted for use with small kitchen appliances to reduce noise transmission. For instance, the sound and vibration reducing apparatus disclosed in U.S. Pat. No. 4,892,413, issued to Vats, provides a rigid insulated housing constructed with intricate hardware and a plurality of levers for operating the appliance controls. Vats does not disclose an appliance enclosure having a ventilation system for independently intaking and exhausting air, while exhausting heat, nor a uniform base and uniform cover securely snapped together without additional hardware. In addition, Vats does not disclose a slidable switch engaging member for engaging appliance switches at varying levels and positions. Another structure is disclosed in U.S. Pat. No. 2,223,196, issued to Watkins. Watkins teaches a sound retention cabinet for suppressing noises generated by calculating machines and does not address problems associated with operating noise produced by appliances.

Accordingly, the structures noted in the background art do not address the problems solved by the instant invention. The instant invention represents an improvement over the parent U.S. application Ser. No. 08/083,653, which issues as U.S. Pat. No. 5,432,306 on Jul. 11, 1995. The instant invention provides a two-piece unit, as opposed to a single jacket, which provides increased durability with a semi-rigid outer shell, and further provides an improved ventilation system for the intake and exhaustion of air, an appliance switch engaging mechanism for triggering switches found in multiple locations and other improvements discussed herein.

SUMMARY OF THE INVENTION

The present invention contemplates an appliance muffler for reducing operating noise emitted by appliances and for providing a durable protective enclosure. The instant invention comprises: a two-piece enclosure including a cover securely and releasably snapped to a base member; a slidable appliance switch engaging mechanism for applying and removing power from the appliance while it is enclosed; a spill and seal adapter disk removably attached to the clutch end of a container for sealing off an opening defined by the cover when the container is mounted to the appliance and for catching spillage from the container during pouring; and, a ventilation system defined by the base for intaking air and exhausting heat to cool the appliance motor.

The cover and base of the instant invention are preferably manufactured from a semi-rigid or rigid polypropylene or other durable polyurethane material, and may be lined with an acoustic absorbing insulation in positions along the interior side wall so as to not interfere with the switch engaging member, air circulation within the enclosure, or the snap engagement between the cover and base. The instant invention also provides raised positioning slots projecting from the floor of the base for positioning the appliance base in alignment with the switch engaging member. Multiple positioning slots are incorporated for aligning appliances produced by different manufacturers to facilitate control and use. The appliance muffler of the instant invention also includes a notched power cord aperture having an opening sufficient for receiving a plug and a notch in communication with the aperture for receiving the cord. This notch allows the cord to be received from the plug aperture so that a door, slidable or hinged, may be closed to eliminate noise emissions therefrom.

The instant invention represents an improvement over the previously disclosed appliance muffler, wherein it provides a two-piece enclosure unit, with semi-rigid to rigid exterior walls and an improved ventilation system. The ventilation system provides a plurality of air intake openings defined by the base for drawing air into the appliance motor through an air intake chamber defined by the base in alignment with the appliance motor. In addition, the ventilation system comprises a separate or independent exhaust means defined by the base which allows air to circulate in the enclosure and exhaust through an exhaust opening.

In accordance with these and other objects which will become apparent hereinafter, the instant invention will now be described with particular reference to the accompanying drawings.

DESCRIPTION OF THE PREFERRED EMBODIMENTS

Figure 1:
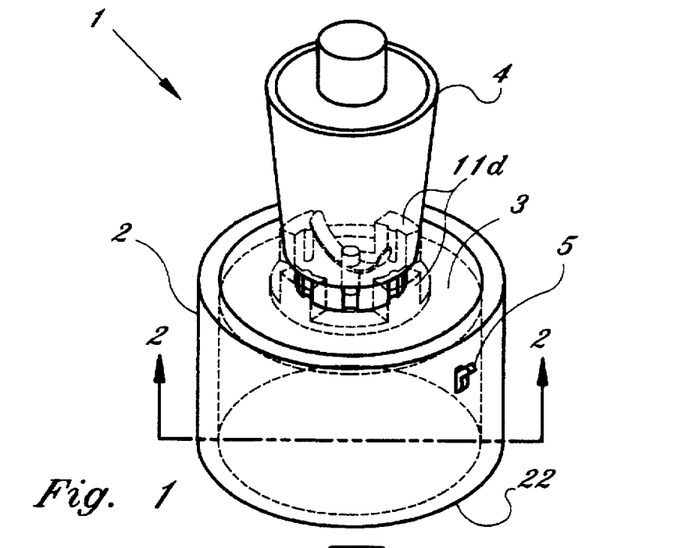
FIG. 1 is a perspective view of an embodiment of an appliance enclosure.
Figure 2:
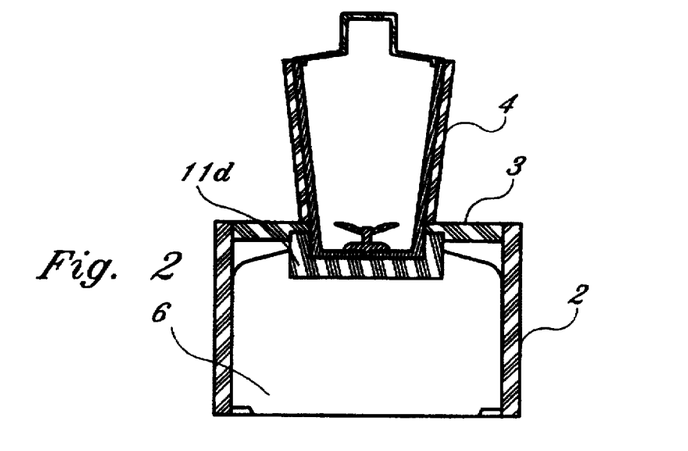
FIG. 2 is a cross sectional view of the appliance enclosure taken along line 2—2 of FIG. 1.
Figure 3:
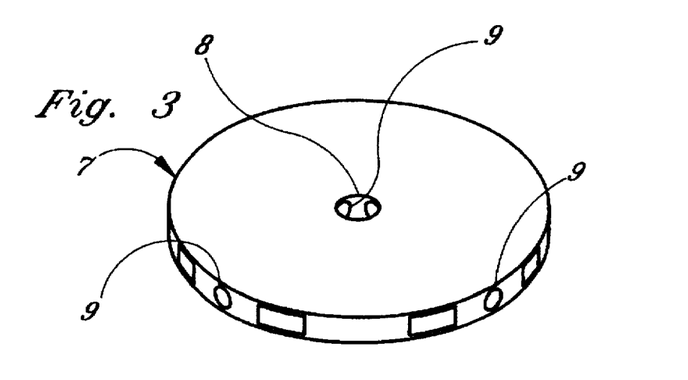
FIG. 3 is a perspective view of an embodiment of a base plate having heat venting channels.

With reference to the drawings, FIGS. 1–11 depict embodiments of the appliance muffling enclosure 1 of an invention for reducing noise and vibration emissions generated by appliances during operation. Referring to FIGS. 1–3, there is shown an embodiment of a single jacket appliance muffling enclosure 1, including a base jacket enclosure 2 defining an open top end for receiving an appliance container fitted with a sleeve 4. A closure panel 3 engages the open top end of the base jacket enclosure for sealing the open top end to prevent noise from escaping the base jacket 2. The closure panel 3 also defines a container receiving aperture to facilitate the mounting of an appliance container to the appliance base 6. Typical containers, such as those used with blender appliances, have a removable disk-like cuff 11d at their lower end which is usually removed for cleaning. The base jacket enclosure 2 defines a switch receiving aperture for receiving an appliance switch 5 so as to allow it to protrude from the base jacket 2.

A base 7 is also provided by this embodiment for mounting and supporting the appliance thereon. The base jacket 2 engages the base 7 to conceal the appliance in an internal volume defined by the base jacket 2 and base 7. The base, as shown in FIG. 3, defines a ventilation means including a central opening 8 and heat venting channels 9 in communication with central vent opening 8 for releasing heat generated by the appliance motor.

Figure 4:
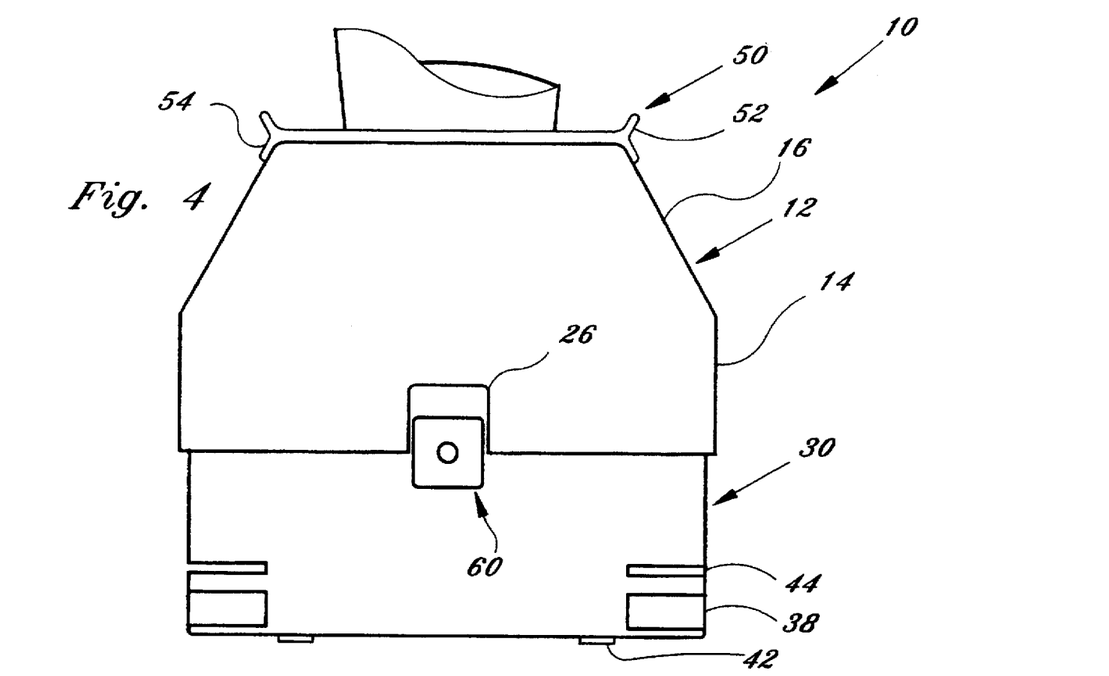
FIG. 4 is a side view of an embodiment of the appliance muffling enclosure of the instant invention, illustrating the enclosure cover snapped to the enclosure base, the switch engaging member, and the ventilation apertures.
Figure 5:
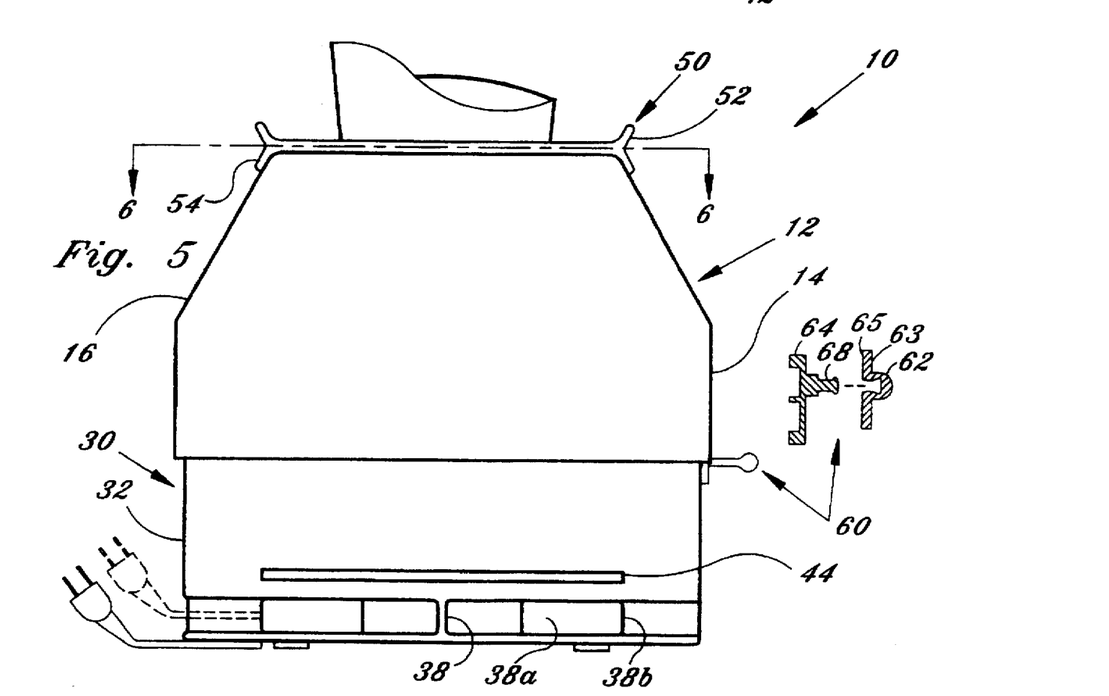
FIG. 5 is a side view of an embodiment of the instant invention taken from a side rotated approximately 90 degrees from the view of FIG. 1, illustrating the switch engaging member, the air intake channels, and the exhaust aperture.
Figure 6:
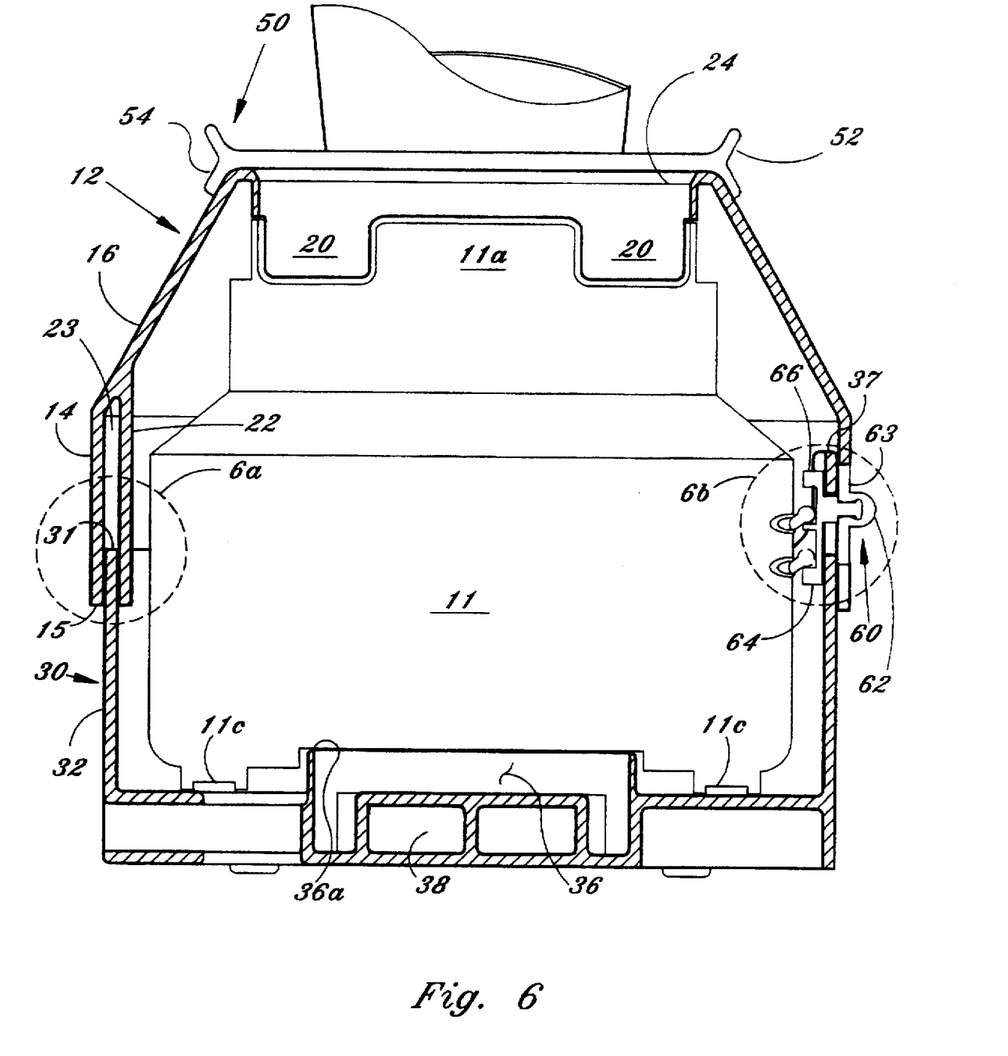
FIG 6 is a cross sectional view of an embodiment of the instant invention taken along line 6—6 of FIG. 5.

With reference to FIGS. 4–6, the preferred embodiment of the appliance muffling enclosure 10 of the instant invention is shown which comprises improved features, to be discussed hereto. The appliance muffling enclosure 10 comprises a cover enclosure 12 which engages a base enclosure 30 by connecting and snapping together with the base enclosure open peripheral edge 31 defined by base side walls 32. Preferably the base open end partially slides into the cover 12 via alignment and depth controlling grooves 23, but, alternatively, the cover 12 may partially slide into the base 30 in a similar manner. The cover enclosure 12 comprises sidewall 14 which are preferably cylindrical for enclosing the upper end of an appliance or appliance base 30, as shown in FIG. 6. The sidewall 14 extend upwardly and preferably begin to taper inwardly and upwardly at a predetermined angle forming an open top end 24, shown in top planar view at FIG. 7. The tapered portion of the side walls form dome-like wall 16 which diverges inwardly to accommodate typical shapes of appliances 11 so as to reduce the interior volume defined by the cover 12 and base 30 enclosures. With reference to FIG. 4, the cover 12 defines a slot or cutout 26 for receiving a switch engaging member 60 and the open end 24 may be enclosed by a spill and seal adapter disk 50, both discussed in detail hereto.

Figure 12:
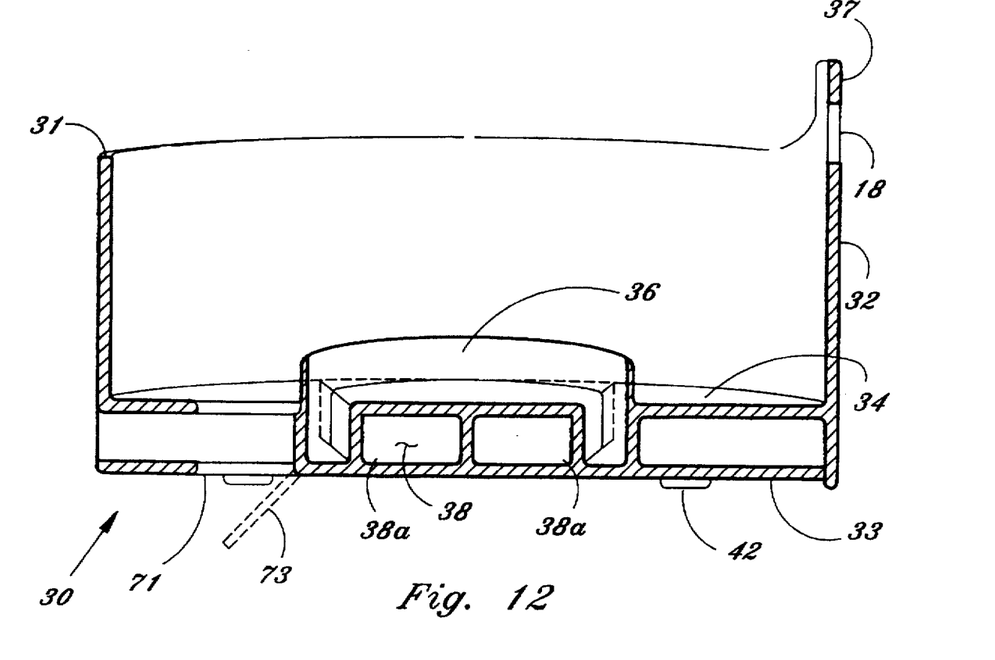
FIG. 12 is a cross sectional view of the base illustrating the air chamber and channels of the instant invention.
Figure 13:
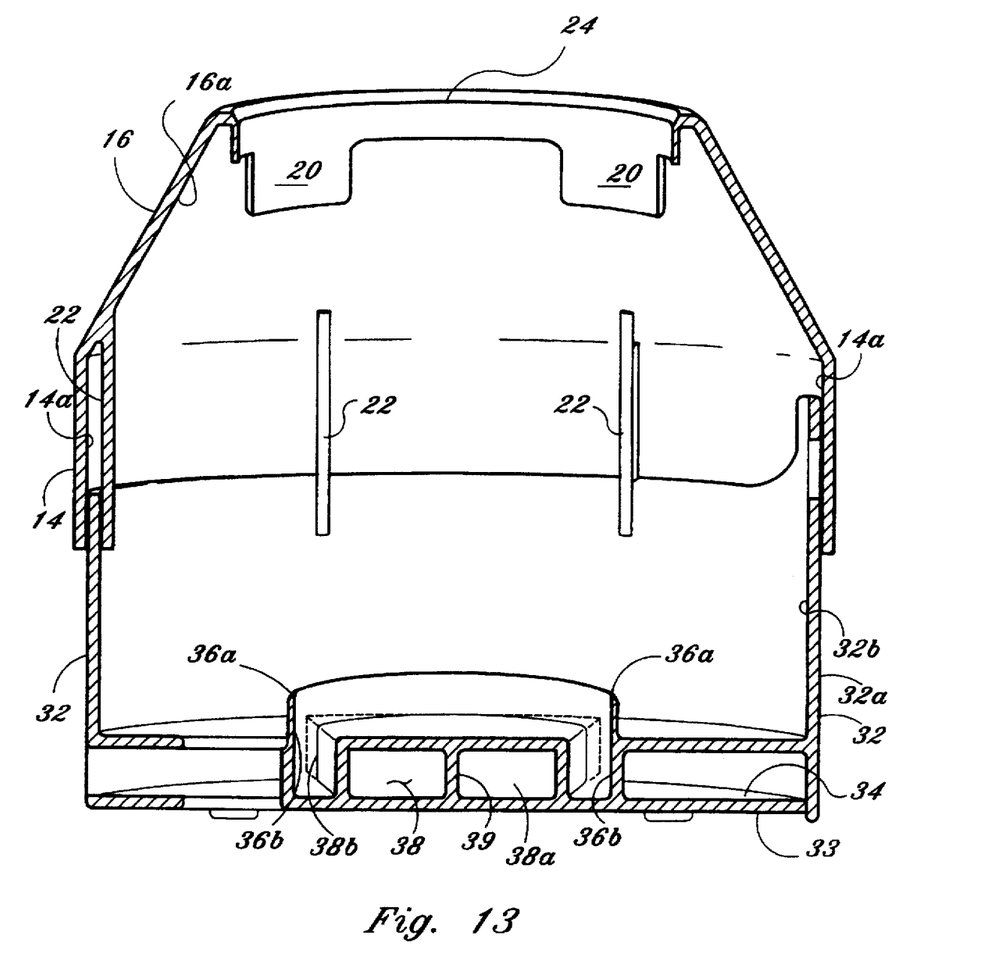
FIG. 13 is a cross sectional view of the cover and base illustrating their connection.

With reference to FIGS. 6–10, the cover 12 of the instant invention 10 comprises sidewall 14, which taper upwardly to form dome sidewall 16, an open top end 24 defined by the peripheral edge of dome side wall 16, an open bottom end defining a peripheral edge 15 which slidably engages the open peripheral edge 31 of the base 30, a plurality of securing posts 22 for securing the cover 12 to the base 30, a plurality of appliance clutch engaging tabs 20 depending from the open top end 24, and an appliance switch engaging aperture 18 as best seen in FIG. 12. The side wall of cover 12 may or may not be tapered at the upper end, and may assume a shape other than cylindrical so long as the appliance is covered, the open top end 24 is defined for receiving a container and the cover is attachable to the base 30.

Figure 6A:
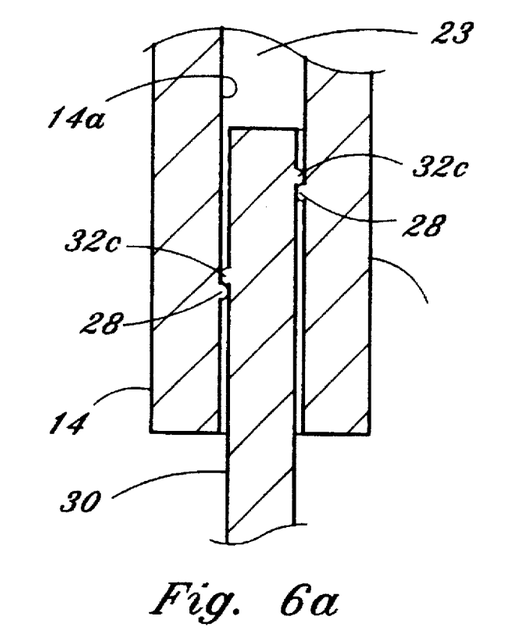
FIG. 6a is a detailed view of the interlock between the cover and the base of FIG. 6 of the instant invention.

The cover 12 is firmly connected to the base 30 by way of sidewall 14 and a plurality of securing posts 22 as best depicted by FIGS. 6 and 6a. The securing posts 22 depend from an interior volume defined by the cover 12 preferably from the interior sidewall of dome wall 16, that is, where the wall begins to taper, to form base engaging grooves 23 with the interior sidewall 14a. The posts 22 may extend outward and downward from ribs attached integral with interior walls 14, or 16 in the alternative, so long as base receiving grooves 23 are defined. When the cover 12 is mounted to the base 30, the peripheral edge 31 of the base is received by the plurality of base engaging grooves 23. The distance in which the base edge 31 intersects grooves 23 may be dependent upon the height of the appliance 11 or by the contact of the appliance clutch engaging tabs 20 with the appliance 11 or by the depth of the groove 23. When the cover 12 is mounted to the base 30, the switch member engaging cutout 26 is aligned with the switch engaging aperture 18 defined by the base side walls 32. Preferably, the aperture 18 is defined in a raised portion 37 of base side walls 32 for proper appliance alignment, but it may be otherwise. The slidable switch engaging member cutout 26 defines an opening of sufficient size for aligning with the switch engaging aperture 18 defined by the base 30 sized to allow for adjustments of the cover on the base with respect to the size of the appliance and to allow the switch engaging member 60 to slide vertically for manipulating the appliance switch. The cutout 26 may be sized for snugly engaging member 60 to increase stability of member 60 when it is actuated. In an alternative embodiment, stops may be defined by the base sidewalls 32, externally or internally, or the grooves 23 may be of a predetermined depth, limited by ribs or the dome wall 16, to limit the depth of mating of the cover 12 and base 30.

Figure 10:
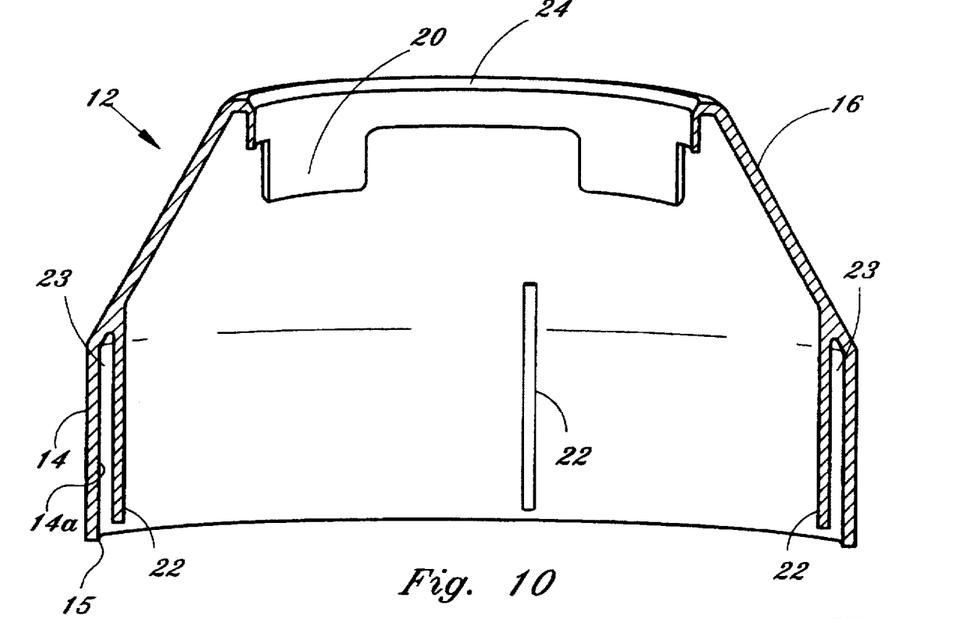
FIG. 10 is a cross sectional view of an embodiment of the cover enclosure of the instant invention taken along line 10—10 of FIG. 9.
Figure 11:
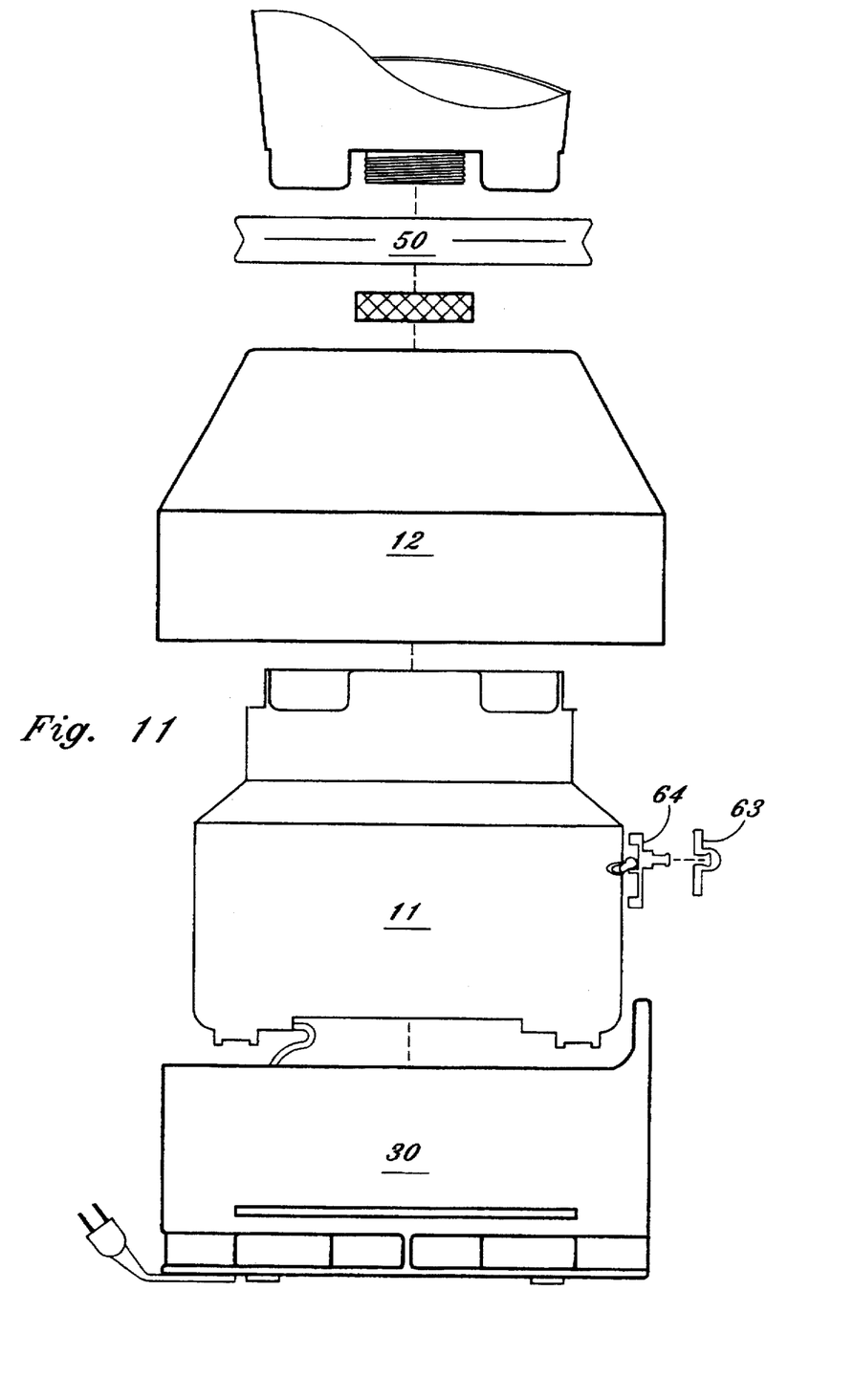
FIG. 11 is an exploded view of an embodiment of the instant invention.

In the preferred embodiment, the securing post 22 or interior of sidewall 14 may define an interlocking means for securing the cover 12 to the base side walls 32 to effectuate a stable connection. As best depicted in FIG. 6a, the interlocking means defined by the securing post 22, or interlocking sidewall 14, may include a tongue or smooth projection 28 protruding into grooves 23 and corresponding detents or projections 32c defined by base side walls 32 for engaging tongue/projections 28. The projections 28 and projections/ detents 32c effectuate snapping engagement between the cover sidewall 14 and base side walls 32. The projections 28 may protrude into groove 23 from either the securing post 22 or the interior sidewall 14a so long as they properly engage corresponding projections/detents 32c defined by base side walls 32. As seen in FIGS. 6 and 10, the securing posts 22 preferably depend downward from the dome sidewall 16 toward the open bottom end of cover 12. The posts may be circular, elliptical, or rectangular in cross section, or any other shape without departing from the scope and spirit of the instant invention. In addition, the posts 22 may extend from sidewall 14 or ribs and then depend down to form grooves 23.

The cover 12 also defines appliance clutch engaging tabs 20. The clutch engaging tabs 20 depend from the open top end 24 for insertion between the raised clutch members 11a defined by the typical appliance, such as blenders. Engaging tabs 20 help to effectuate complete enclosure of the appliance and may also limit the mating between the cover 12 and base 30. The number of engaging tabs 20 typically corresponds to the number of openings defined by the raised clutch members 11a. The open top end 24 also facilitates the receiving of an appliance container for mounting to the appliance 11, such as the blender shown in the Figures.

With reference to FIGS. 4–6, 10, 12, 14 and 15, the base enclosure 30 of the instant invention 10 comprises side walls 32, preferably forming a cylindrical open peripheral edge 31, base bottom end 33, base floor 34 defined by the interior, air intake chamber 36, a plurality of air intake channels 38 in direct communication with air chamber 36, and a plurality of appliance positioning slots 40 projecting from the floor 34 for engaging appliance feet 11c typically found on the bottom of conventional appliances of different manufacturers. The base enclosure 30 defines a uniform unit having a closed bottom end 33 with side walls projecting upwardly from the bottom end 33 to form an open top end/peripheral edge 31 which engages grooves 23 defined by the cover 12. The base may be substantially cylindrical or any other shape without departing from the scope of the instant invention so long as it is connectable to the cover 12. The base floor 34 is defined by the interior of the base 30 and provides, at a minimum, a surface for mounting and supporting the appliance 11.

The base 30 also comprises a cooling and ventilation means including an air intake chamber 36, air intake channels 38 and exhaust means 44. The air intake chamber 36 projects upward into the volume of the base enclosure 30 from the bottom end 33 for engaging the peripheral edges of the appliance motor commonly found on the bottom of conventional appliances, such as blenders. The air intake chamber 36 draws in, contains, and facilitates, the intake of air from ambient for cooling the motor during operation. An upper open peripheral edge 36a is defined by the air intake chamber 36 and engages or comes within the proximity of the motor for facilitating the intake of ambient air. The air intake chamber 36 is defined by chamber walls 36b, which project from the base bottom 33 to form a substantially cylindrical chamber 36. The chamber 36 may be a shape other than cylindrical without departing from the scope and spirit of the instant invention so long as it facilitates the drawing in of ambient air through the motor of the appliance 11. The base further defines a plurality of air intake channels 38 which diverge from the base side walls 32 toward the air intake chamber 36. Accordingly, the air intake channel 38 opening at the base side wall 32 is larger than the opening at the air intake chamber 36. The air intake channel 38 communicates with the air intake chamber 36 via air chamber intake opening 38a defined at the narrow end of the air channel 38. Ambient air is drawn into the channel 38 via air channel intake openings 38b defined by the base side walls 32. The air intake channel 38 is wider at the intake opening 38b than the air chamber opening 38a because of the preferred cylindrical structure of the base 30 and chamber 36, and also to accelerate air into the chamber 36. The size of the openings 38a, 38b defined by the air intake channel 38 is designed for facilitating the suction of air into the chamber 36 without substantially defeating the reduction of noise and vibrations. The air intake channels 38 may be formed by partitions 39 which extend radially from the base side walls 32 toward the air chamber 36. In addition to forming channels 38, the partitions 39 join the base floor 34 and base bottom end 33, and support the floor 34 above the bottom end 33. The openings formed between the base floor 34 and bottom end 33 by partitions 39 are closed off by the base side walls 32 around the base 30 exclusive of the areas dedicated for the air intake channels 38. This provides an enclosed structure around the base to reduce noise emissions. The partitions place the floor 34 at a level for aligning the appliance switch 11b with a switch engaging member 60, discussed hereto, and for positioning the appliance motor over the air chamber 36. In the alternative, the floor 34 and bottom end 33 may comprise one integral structure with channels bored therethrough without departing from the scope and spirit of the invention. However, partitions are preferred over a solid base floor structure for conserving material. The exhaust opening 44 defined by the sidewalls 32 is preferably located above the air intake channels 38 which is above the floor 34. This separation allows air to circulate above the floor 34 around the appliance and to freely exhaust heat at opening 44.

Figure 14:
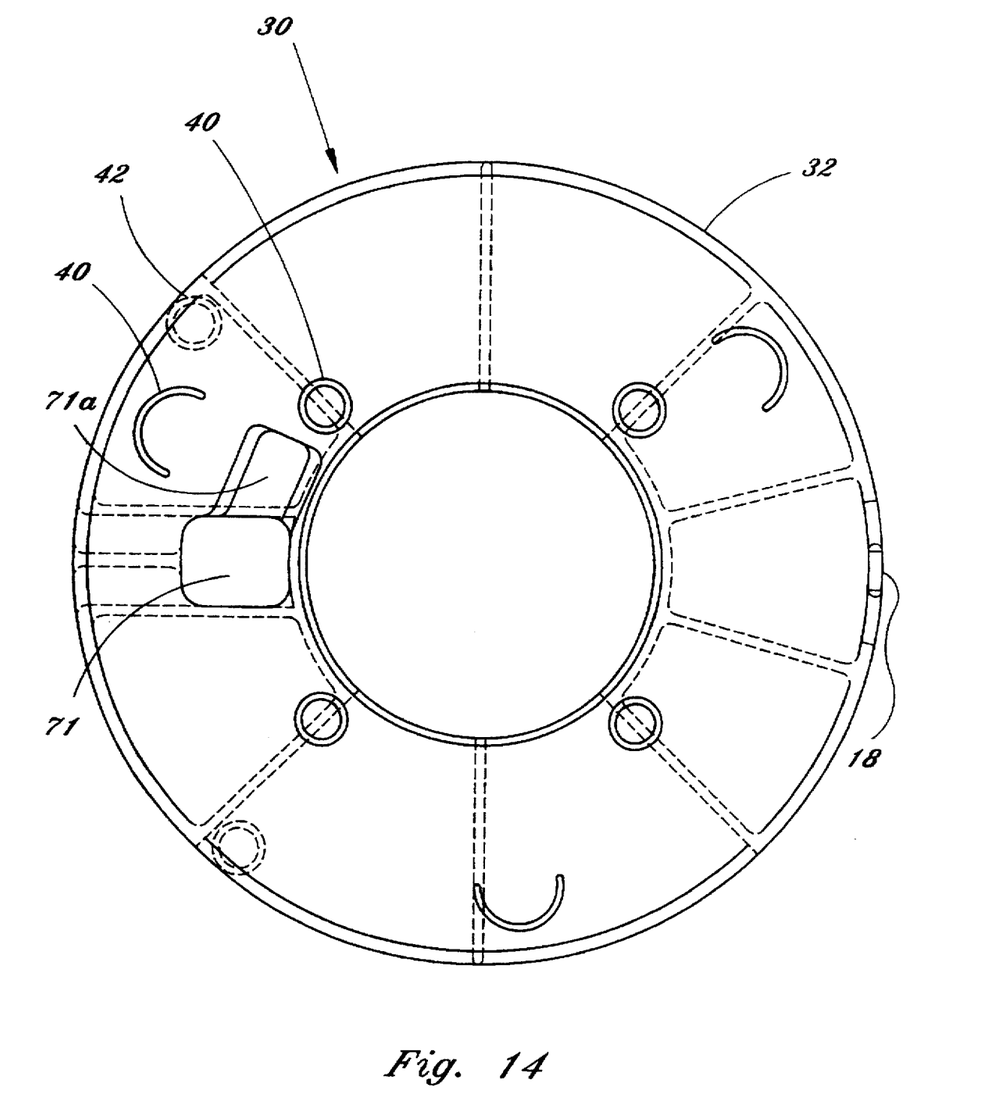
FIG. 14 is a inside top planer view of the floor of the base of the instant invention.
Figure 15:
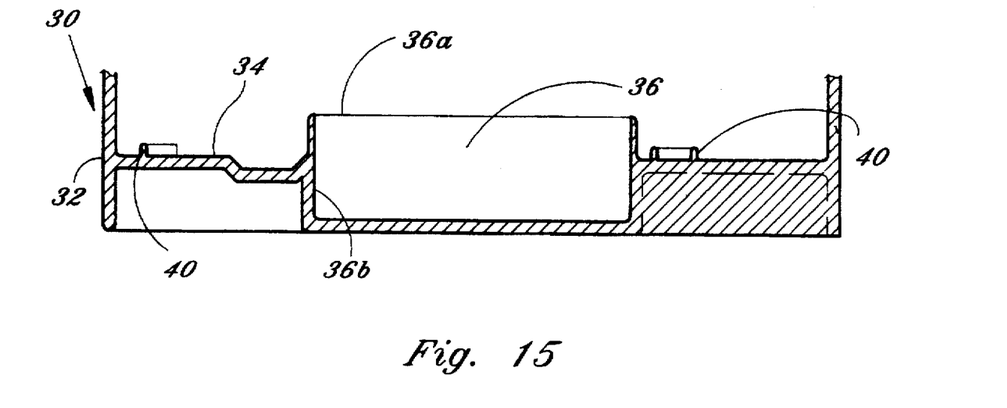
FIG. 15 is a cross sectional partial view of the base of the instant invention illustrating the air chamber and raised positioning slots.
Figure 16:
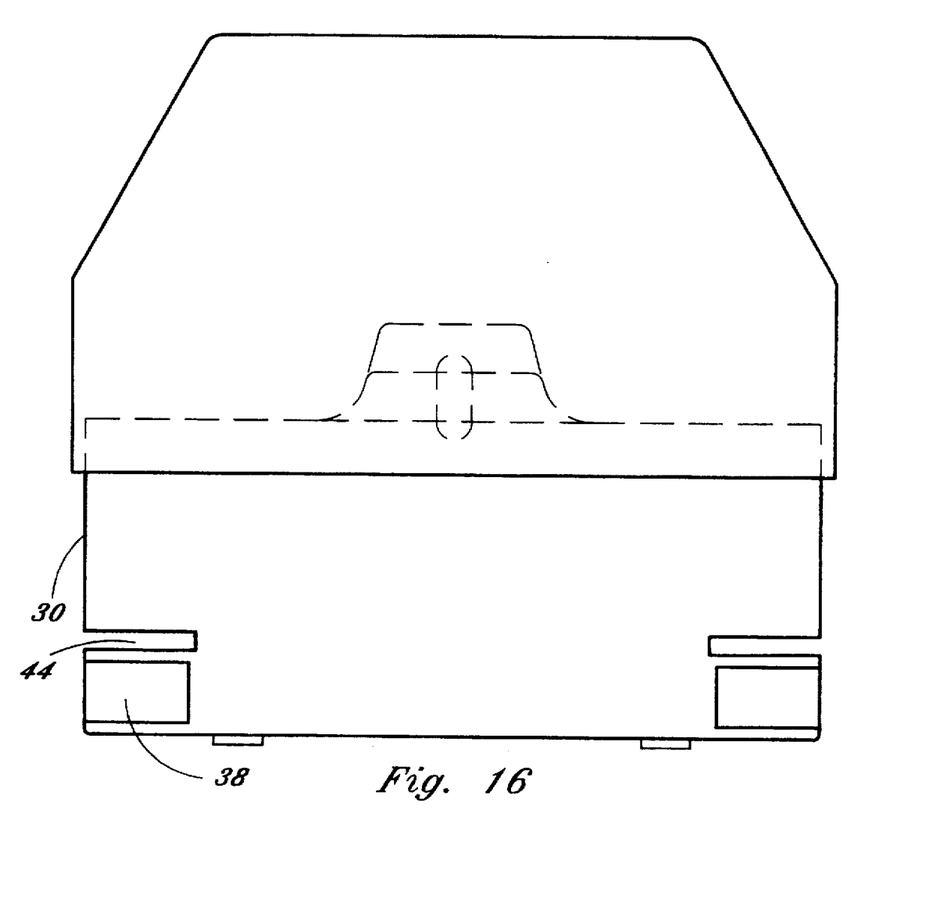
FIG. 16 is a side view of the base of the instant invention.

As depicted in FIG. 14, a plurality of appliance positioning slots 40 project from the base floor 34 for engaging appliance feet 11c, commonly found depending from the bottom end of most appliances. The appliance positioning slots 40 may align the appliance within the base enclosure 30 for facilitating engagement with the appliance switch or switches via the appliance engaging aperture 18. It is the primary object of the slots 40, however, to secure the appliance is in a set position. In the alternative, the height of the positioning slots may be predetermined for setting the appliance at a predetermined height but it is preferred that the floor 34 level be designed to effectuate proper vertical alignment. The positioning slots 40 may vary in shape, size, and position on the base floor 34 for corresponding to different style appliances having varying feet structures and arrangements. For instance, HAMILTON BEACH manufactures a blender appliance having four cylindrical feet which would correspond to the four positioning slots 40 found on base floor 34, while WARING manufactures a blender appliance having three crescent-shaped feet which would engage the crescent-shaped positioning slots shown in the drawings.

In a preferred embodiment, the instant invention includes feet 42 depending from the base bottom end 33 for supporting the enclosure on a top with predetermined clearance and to minimize vibrations.

The base structure 30 of the instant invention, as discussed, comprises a novel heat and air venting means comprising the air intake chamber 36 and air intake channel 38, noted above, and an exhaust independently defined by the base side walls 32. The exhaust openings 44, as shown in FIGS. 5 and 6, preferably comprise an elongated opening defined by the base side walls 32 above the air intake channels 38 and above the base floor 34. The base floor 34 separates the air intake channels 38 and the exhaust channel 44. Heat is typically expelled from the appliance during operation to keep the appliance cool in open environments. Since the appliance is being enclosed by the enclosure of the instant invention 10, an exhaust opening 44 is defined by the side walls 32 so that heat expelled from the appliance may be exhausted through the exhaust openings 44 to prevent heat buildup within the enclosure. As noted, the exhaust opening 44 is fluidly independent from the air intake channels 38, whereby they are separated by the base floor 34. The base floor 34 separates the air intake channels 38 and the exhaust channel 34 so that air may be drawn into the appliance motor via channels 38 and chamber 36 and heat discharged from the appliance into the volume defined by the base interior side walls 32b and the base floor 34 for expelling out the exhaust channels 44. While the exhaust channel 44 is preferably aligned above the air intake channels 38, the exhaust 44 may be defined by the base walls 32 in other locations without departing from the scope and spirit of the instant invention so long as it is in communication with the volume experiencing heat.

The instant invention further comprises a spill and seal adapter disk 50 having dimensions compatible for covering the open top end 24 defined by the cover closure 12. The adapter disk 50 comprises a substantially flat, annular disk having a flared peripheral edge as shown in FIGS. 4–6 and 8. The flared peripheral edge comprises a first upward flange 52 projecting upwardly away from the edge at an angle with respect to the disk 50 so as to form a cavity for receiving spilled fluid, and a second downward flange 54 projecting downwardly away from the edge at an angle with respect to the disk 50 so as to substantially conform to the contours of the dome sidewall 16 or other sidewall surface proximal the cover open end so as to substantially seal off the open end 24 for concealing sound emissions. A container receiving opening 56 is defined by the adapter disk 50 for receiving the bottom end of an appliance container. When the bottom end of an appliance container is received by the opening 56, it also passes through opening 24 defined by the open top end of the cover 12. Typical containers, such as those used with blender appliances, have a removable disk-like cuff 11d at their lower end which is usually removed for cleaning. This disk-like cuff 11d is usually screwed onto the bottom of the container. The adapter disk 50 is best attached to the bottom end of the container after the container cuff is removed. Then the cuff may be placed back on the container end after the adapter disk 50 is mounted so the disk 50 does not interfere with the mounting of the container cuff to the appliance base. Alternatively, the adapter disk 50 may define an opening 56 having sufficient dimensions for receiving the lower end of a container with or without the removable cuff 11d.

Figure 6B:
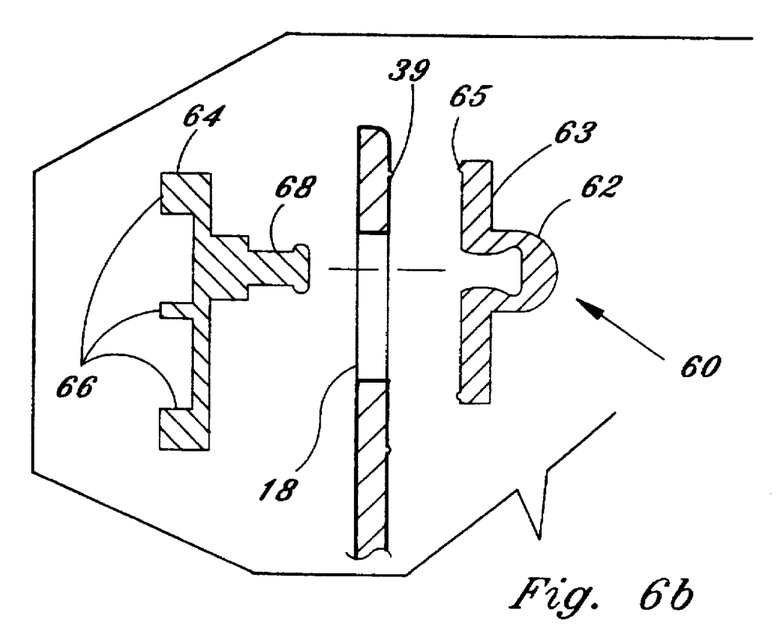
FIG. 6b is a detailed exploded view of a switch engaging member of FIG. 6 of the instant invention.
Figure 7:
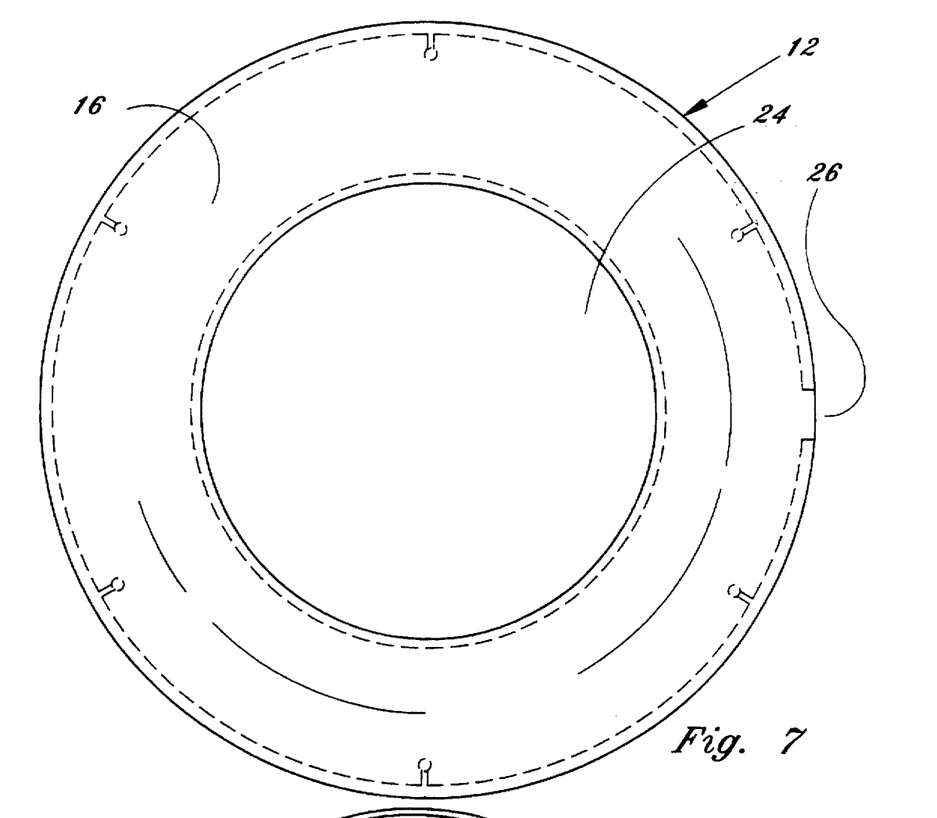
FIG. 7 is a top planar view of an embodiment of the enclosure cover of the instant invention, illustrating the container receiving aperture, clutch engaging tabs, and the switch engaging aperture.
Figure 8:
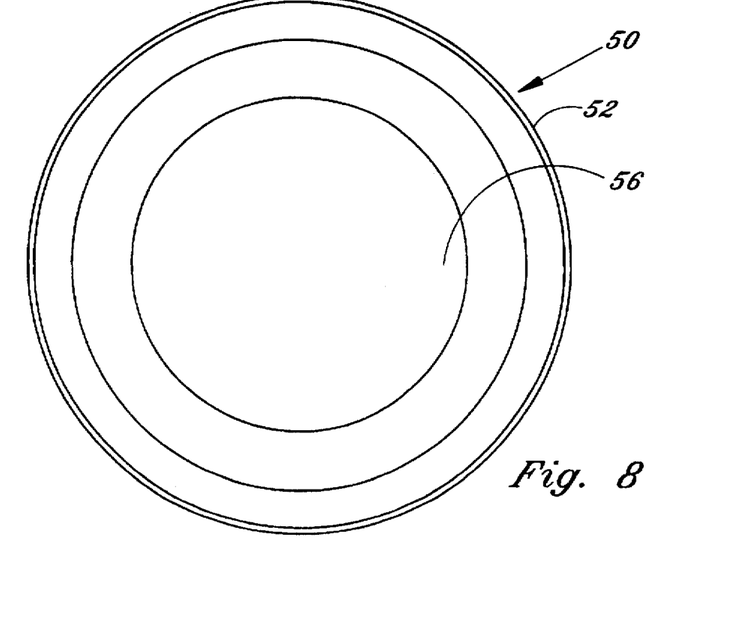
FIG. 8 is a top planar view of an embodiment of the spill and seal adapter disk of the instant invention, illustrating the container receiving aperture.
Figure 9:
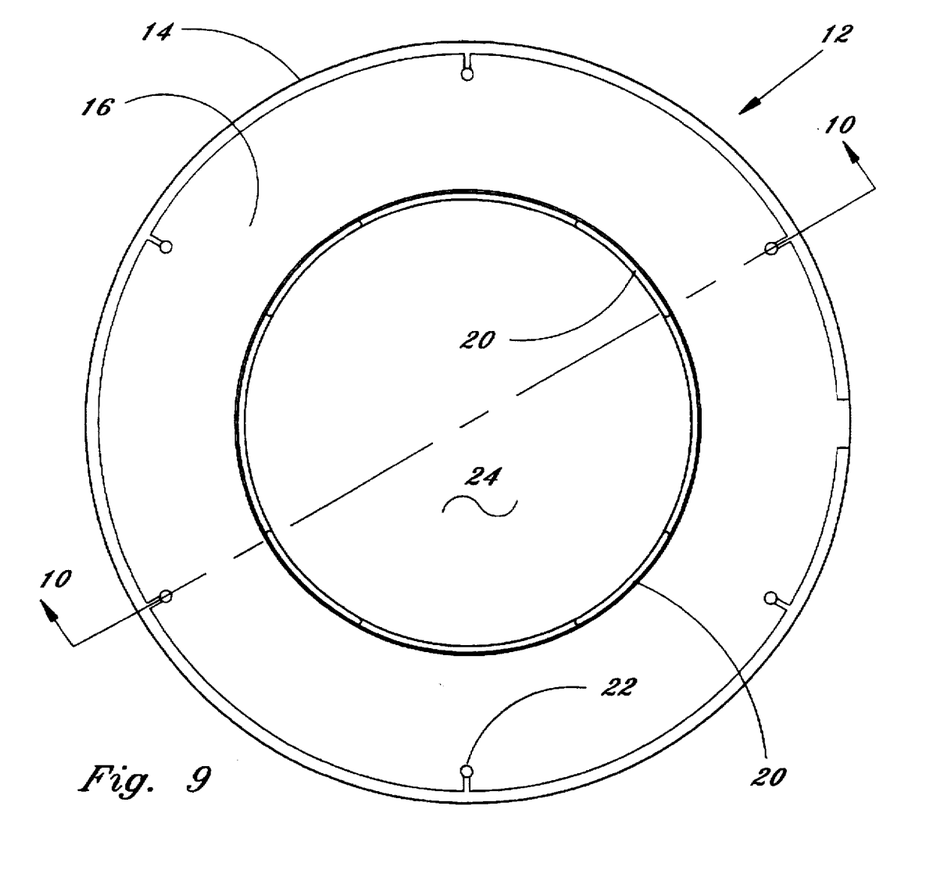
FIG. 9 is a bottom planar view of an embodiment of the cover housing of the instant invention, illustrating the clutch engaging tabs and plurality of depending posts for snappingly engaging the base enclosure.

A triggering means, including a slidable switch engaging member 60 intersects the cutout 26 of cover 12, and the switch engaging aperture 18 defined by base 30 for actuating the switches 11b. As noted above, the cutout 26 provides a sufficient opening for providing access to the switch engaging aperture 18 when the cover 12 is mounted to base 30 and for receiving the slidable switch engaging member 60 in all actuating positions. The slidable switch engaging member 60 comprises a first-exterior plate 63 from which a user engaging knob 62 projects, a second-interior plate 64, and a connecting bridge 68, joining the exterior plate 63 and the interior plate 64. The interior plate 64 comprises a main member having a plurality of switch engaging feet 66 projecting inward from the interior face of the plate 64 toward the appliance when the slidable switch engaging member is assembled. The slidable switch engaging member 60 is assembled by connecting the exterior plate 63 to the interior plate 64 by way of a connecting bridge 68 that intersects aperture 18 so that the switch engaging feet 66 kick the appliance switch ON and OFF for applying and removing power when the switch engaging member 60 is actuated by the user. The member 60 is preferably moved in a sliding motion. In the preferred embodiment, the interior plate resembles an "E" for manipulating switches which are typically found in either one of two positions, such as on the HAMILTON BEACH and WARING models. Multiple feet 66 are provided to accommodate appliances of different manufacturers that place their switches in varying locations. In the alternative, the interior plate 64 may be designed with a plurality of feet 66 that are capable of manipulating a plurality of switches simultaneously. The bridge 68 mechanically joins the interior and exterior plates 64, 63. The bridge 68 intersects the switch engaging aperture 18 so that the exterior plate is slidable along the exterior side walls of the base whole in mechanical communication with the interior plate 64, which slides along the interior side walls of the base 30. The bridge 68 may be integrally formed with one plate and snapped into an interlocking structure or aperture defined by the other plate or, in the alternative, the bridge may be snap-fitted into both plates. More than one bridge 68 may be employed for additional stability between the plates, as well. In the preferred embodiment, the interior plate 64 resembles an "E" shape for accommodating blenders manufactured by HAMILTON BEACH and WARING, which provide switches at different levels on the appliance. The plates and bridge are designed to firmly engage the base side walls 32 when assembled. Tabs and/or detents, such as 65 and 39, may be formed in the base side walls 32 and on a corresponding face of either plate, both above and below the switch engaging aperture 18 for locking the switch engaging member 60 into its position. That is, tabs and detents 39 and 65 may project from both the side wall and plate on either side, having heights that facilitate overcoming each other, or tabs and detents may be formed in either one of the plates or side walls, mating in interlocking fashion.

The cover 12 and base 30 comprise individual, uniform structures that are manufactured by injection molding into uniform structures. The cover 12 and base 30 may be injection molded from preferably a polypropylene or a similar plastic or polyurethane material to provide a semi-rigid-to-rigid structure having walls ranging from 1/16 inch upwards to 1/2 inch. The cover 12 and base 30 are injection molded to the structure as disclosed herein to reduce the number of removable or connecting parts and to facilitate snapping engagement. Likewise, the switch engaging member 60 may be injection molded, and the bridge 68 may be injection molded with either plate or it may comprise a separate piece connectable between the two plates with interlocking structures such as tabs, nipples and/or detents. Finally, the adapter disk 50 is also preferably made from a polypropylene or similar plastic or polyurethane by injection molding by may also comprise a softer more flexible material such as light plastic, rubber, foam, neoprene, etc..

The instant invention may also include foam insulation (not shown), lining the interior walls of the cover and base to provide additional acoustic absorption. The foam insulation may be installed along the side walls so as to not interfere with the slidable switching engaging member 60 or the securing posts 22, and sized so as to not interfere with the circulation of air or heat from the appliance as it exits through the exhaust channel 44. Foam insulation is preferably manufactured from a sound, vibration, and shock-absorbing synthetic, such as neoprene, polystyrene foam, synthetic rubber, or other foam-like material.

The instant invention also provides structure for the passing of the appliance cord through the base 30 of the instant invention. The cord receiving apertures of the base 30 are defined by cutouts in both the floor 34 and the bottom end 33, however, the opening between the floor 34 and bottom end 33 in the embodiment using the partitions 39 may be utilized for passing the cord instead of passing it through the cord opening 71 on the bottom end 33. It is preferred, however, that a cord aperture cutout 71 be made in the bottom end 33 in alignment with the cutout 71 in floor 34 of a size sufficient to pass the plug end of the appliance cord. In addition, the cutout 71 in both the floor 34 and the bottom end 33 may have an additional slot in communication with the cutout 71 wherein the slot 71a would be of smaller width for sliding the cord therein after the plug has been passed through plug cutout 71. After the cord has been maneuvered and fitted into slot 71a a hinged door, or slidable door 73, may be closed to seal cutout 71.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An appliance muffling enclosure for reducing noise and vibrations caused by the operation of an electrical appliance of the type having an electric motor, at least one switch and a clutch for receiving and mounting an appliance compatible container, said enclosure comprising:

a cover enclosure defining an open top end for receiving the container and an open lower end, said open top end and said open lower end being joined by a wall;

a base enclosure having an open upper end and a closed bottom end, said open upper end and said closed bottom end being joined by a wall, said cover open lower end being slidably mated with said base open upper end to form an interior volume for enclosing the appliance;

switch engaging means, in mechanical communication with said cover and said base enclosure, for triggering the appliance switch from outside said enclosure, said switch engaging means being attached to said enclosure in alignment with the appliance switch when the appliance is enclosed in said interior volume; and venting means, defined by said base enclosure, for cooling the appliance motor.

2. An enclosure as recited in claim 1, wherein said base wall and said cover wall slidably interlock.

3. An enclosure as recited in claim 1, wherein said venting means comprises:

air intake means for intaking ambient air to cool the appliance and motor, said air intake means being defined by said base enclosure; and exhaust means, defined by said base wall, for exhausting heat generated by the appliance, said exhaust means being separated from said air intake means.

4. An enclosure as recited in claim 3, further comprising:

a raised floor defined by said base above said closed bottom end for supporting the appliance and separating said intake means from said exhaust means, said exhaust means being defined by said base above said floor, said air intake means being defined by said base below said floor.

5. An enclosure as recited in claim 4, further comprising:

means, defined by said cover, for releasably securing said cover to said base.

6. An enclosure as recited in claim 5, wherein said air intake means comprises:

an air intake chamber projecting upwards into said volume from said floor to form an open ended chamber in alignment with the appliance motor when the appliance is placed in said base enclosure; and at least one air intake channel extending radially through said base enclosure between said closed bottom end and said floor, said air intake chamber being in fluid communication with ambient air and said air chamber for drawing ambient air into said air chamber and into the appliance motor.

7. An enclosure as recited in claim 6, wherein said exhaust means comprises an exhaust opening defined by said base wall for exhausting said heat generated by said motor.

8. An enclosure as recited in claim 7, further comprising:

aligning means, defined by said floor and corresponding to appliance legs, for aligning the appliance inside said enclosure in a predetermined position so as to align the appliance switch with said switch engaging means.

9. An enclosure as defined by claim 8, wherein said switch engaging means comprises:

a switch engaging aperture defined by said base wall proximal said open upper end;

a first plate disposed inside said enclosure adjacent said switch engaging aperture;

a second plate disposed outside said enclosure and connected to said first plate through said switch engaging aperture; and trigger means, defined by said first plate, for engaging the appliance switch, said trigger means engaging the appliance switch when said second plate is slidably moved.

10. An enclosure as defined by claim 9, further comprising:

adapter means, attachable to the appliance container, for sealing said open top end and for catching spillage from the appliance container.

11. An enclosure as defined by claim 10, wherein said adapter means comprises an annular disc defining a central appliance receiving aperture for connecting to the appliance container, said annular disc defining an outer flared peripheral edge.

12. An enclosure as defined by claim 11, further comprising:

a cutout defined by said cover wall for receiving said second plate.

13. An enclosure as recited in claim 12, further comprising an acoustic absorbent lining disposed along said interior volume.

14. An appliance as recited in claim 6, wherein said channels are tapered such that they diverge towards said air chamber from said base wall.

15. An enclosure as defined by claim 1, further comprising:

a spill adapter ring, attachable to the appliance, for engaging and sealing said cover open top end and for catching spillage from the appliance container.

16. An enclosure as recited in claim 15, further comprising a raised floor defined by said base above said closed bottom end for supporting the appliance and bifurcating said venting means to draw cool air into said interior volume from below said floor and to exhaust heat out into ambient from above said floor.

17. An enclosure as recited in claim 16, further comprising:

aligning means, defined by said floor and corresponding to appliance legs, for aligning the appliance inside said enclosure in a predetermined position so as to align the appliance switch with said switch engaging means.

18. An enclosure as recited in claim 17, wherein said venting means comprises:

air intake means for intaking ambient air to cool the appliance and motor, said air intake means being defined by said base enclosure; and exhaust means, defined by said base wall, for exhausting heat generated by the appliance, said exhaust means being separated from said air intake means.

19. An enclosure as defined by claim 18, wherein said switch engaging means comprises:

a switch engaging aperture defined by said base wall proximal said open upper end;

a first plate disposed inside said enclosure adjacent said switch engaging aperture;

a second plate disposed outside said enclosure and connected to said first plate through said switch engaging aperture; and trigger means, defined by said first plate, for engaging the appliance switch, said trigger means engaging the appliance switch when said second plate is slidably moved.

20. An enclosure as defined by claim 19, wherein said adapter means comprises:

an annular disc defining a central appliance receiving aperture for connecting to a bottom end of a container, said annular disc defining an outer flared peripheral edge.

21. An enclosure as recited in claim 6, further comprising:

means, defined by said cover, for releasably securing said cover to said base.

22. An enclosure as recited in claim 21, wherein said releasable securing means comprises:

a plurality of securing posts depending from inside said cover toward said open lower end; and a plurality of grooves defined between said plurality of securing posts and said cover wall, each of said securing posts defining a separate groove, said grooves slidably receiving said base wall along said open upper end when said cover is removably engaged with said base.

23. An enclosure as recited in claim 22, wherein said venting means comprises:

air intake means for intaking ambient air to cool the appliance and motor, said air intake means being defined by said base enclosure; and exhaust means, defined by said base wall, for exhausting heat generated by the appliance, said exhaust means being separated from said air intake means.

24. An enclosure as recited in claim 23, wherein said securing means further comprises a means for snapping said base wall in said grooves, said snapping means being defined by said cover wall and said base wall.

25. An enclosure as recited in claim 24, wherein said cover further comprises a plurality of appliance clutch engaging tabs depending from said cover open top end inside said cover, said tabs being spatially disposed so as to correspond to the appliance clutch.

* * * * *